C. A. DEAS.
CONVERTIBLE ROADSTER BODY.
APPLICATION FILED MAY 8, 1920.
1,383,262.
Patented June 28, 1921.
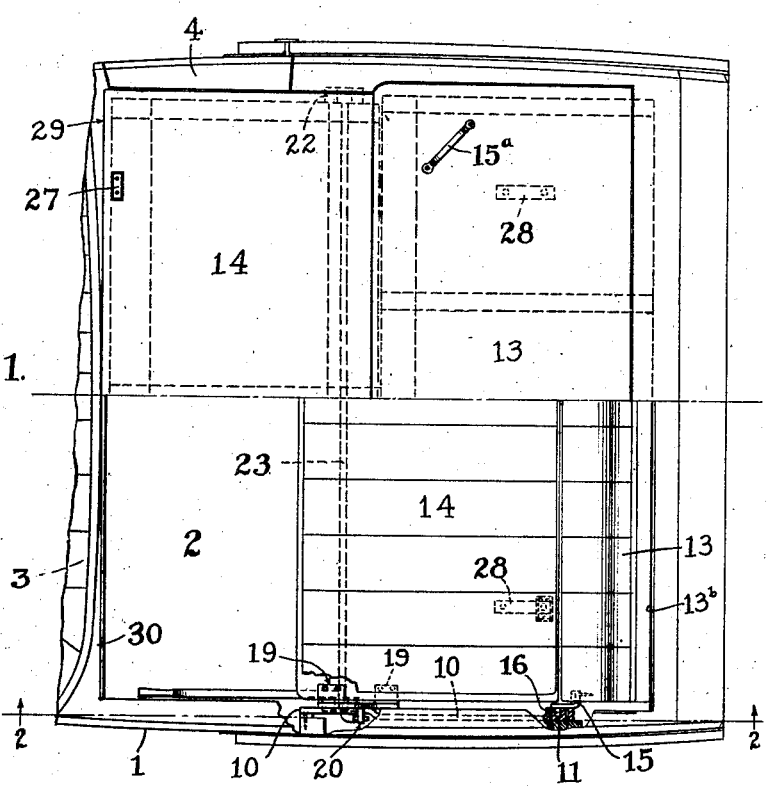
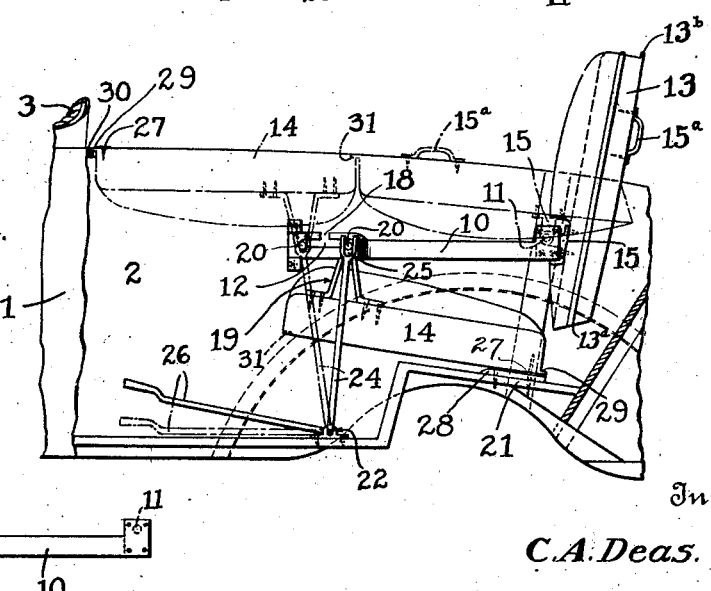
Inventor
C. A. Deas.
By Mason Fenwick & Lawrence
Attorneys

UNITED STATES PATENT OFFICE.

COON A. DEAS, OF ROCK HILL, SOUTH CAROLINA, ASSIGNOR TO ROCK HILL BUGGY COMPANY, OF ROCK HILL, SOUTH CAROLINA, A CORPORATION OF SOUTH CAROLINA.

CONVERTIBLE-ROADSTER BODY.

1,383,262.                Specification of Letters Patent.    Patented June 28, 1921.

Application filed May 8, 1920. Serial No. 379,895.

*To all whom it may concern:*

Be it known that I, COON A. DEAS, citizen of the United States, residing at Rock Hill, in the county of York and State of South Carolina, have invented certain new and useful Improvements in Convertible-Roadster Bodies; and I do hereby declare the following to be a full, clear, and exact description of the invention, such as will enable others skilled in the art to which it appertains to make and use the same.

The general purpose of this invention is to provide a vehicle body whereby a vehicle may be converted from a two seated conveyance having a rear passenger compartment to a one seated conveyance having the rear compartment decked or covered to constitute a storage space; and it is a particular object of the invention to utilize the rear seat and back as covers for the rear compartment when the body is to serve as a one seated body, and also to provide means to facilitate the necessary shifting of the said seat and back, when the conversion is to be made from a body having two seats into a body having one seat and a covered storage space, or the reverse.

In the accompanying drawings in which similar reference characters designate corresponding parts throughout the several views:

Figure 1 is a divided plan view of so much of a motor vehicle body as is necessary to disclose my improvement, one half of which represents the open condition and the other half the closed condition of the rear passenger compartment;

Fig. 2 is a side elevation, one side of the body having been broken away to show the interior arrangement;

Fig. 3 is a view of a bearing plate.

The invention is illustrated in connection with a body 1 having a compartment 2 rearward of the front seat 3. A door 4 provides for admission to the compartment 2 at the right hand side of the vehicle only. Said compartment 2 is fitted with a rear upholstered seat 14 and back 13 adapted to the use of passengers, the construction and arrangement being such that the said seat and back may be shifted so as to cover or deck over the compartment substantially weatherproof, thereby converting the vehicle from a two seated car into a single seated roadster.

Secured to the inside of each side wall of the compartment 2 is a metallic bar 10 having a bearing socket 11 at its rear end and a slot 12 at its forward end constituting a slide bearing. The rear bearings 11 sustain pivotally the back 13, and the forward slotted slide bearings 12 sustain the seat 14.

On each end of the frame structure of the back 13 is bolted a bracket 15 having lateral studs 16 which are pivoted in the bearings 11 formed in the rear ends of the bars 10. The said brackets 15 are secured to the frame of the back 13 below its center and in such position that when the back is located in the position shown in full line in Fig. 2, it is in the correct position to form a comfortable back rest for a passenger seated on the rear seat 14. The relative position of the said bearings 11, bearing brackets 15 and studs 16, with respect to the back and the vehicle body 1 is such that when the back 13 is turned about the pivot 16 to a horizontal position it will close the top of the rear portion of the compartment 2, as indicated in dotted line in Fig. 2 and at the upper half of Fig. 1, and constitute a hatch or cover having a surface flush with the decking of the body 1. The lower or rearward edge of the said back 13 is beveled, as shown at 13$^a$, so that when positioned to serve as a hatch or cover for the compartment the said rear beveled end will engage snugly the rear side of the opening or coaming of said compartment 2. A lip or ledge 13$^b$ projects from the other or forward edge of said back 13 and is adapted to engage over the rearward edge of the seat 14 when the latter is positioned to aid in closing the compartment, as will be presently explained. The said back portion 13 is provided with a handle 15$^a$ whereby it may be shifted from closed to open position by hand.

The slot 12 constituting the slide bearing extends fore and aft of the bar 10. At each end of said slot 12 are depressed seats 16 and 17. A passage 18 extends midway from the said slot 12 upward through the bar 10. The frame of the upholstered seat 14 carries at each end a bracket 19, said bracket having a general V-formation. Extending laterally from the point of each V-shaped bracket is a lateral stud 20 positioned and arranged to engage in the slot 12 and to have a bearing in either of the depressed seats 16 or 17, depending upon the position of the seat. When the back 13 is in the open position the seat 14 may be rotated on the studs 20 of the said bracket 19, seated in the depressed seats 16 at the forward ends of the slots 12 in the back 10, and when rotated from the position shown in dotted lines in Fig. 2 to the position shown in full lines, the rear thereof will rest upon seat support 21 formed on the body frame. At that time when the stud 20 rests in the front ends of the slots 12 the seat will be too far forward. It may then be forced rearward into the proper position, the lateral studs 20 of the brackets 19 sliding rearward in the slot 12 until they reach the seats 17 under which condition the seat 14 will be in the proper position to accommodate passengers. Its rear edge will rest upon the frame support 21 and its front end will be sustained on the bar 10 by the brackets 19 and the lateral studs 20 resting in the depressed seat 17 of slot 12.

Extending across the bottom of the compartment 2 and journaled in bearings 22 is a rod 23 having a lever arm 24 projecting upward from each end. The upper ends of these lever arms are provided with open ended slots 25 which engage the lateral studs 20 on the brackets 19 secured to the seat 14. Secured to said rods and extending forward at the left hand side of the machine close to the side wall that contains no door, as shown, is a lever 26, by which the said seat may be pushed rearward or moved forward to the extent permitted by the slots 12. By this means the said seat may be caused to slide evenly so that every part of it will move in parallel lines, avoiding all tendency of the seat to slue and jam while being pushed forward or backward.

On the underside of the seat, at each end near its rear, considering the seat in its open position or ready for receiving passengers, is a plate 27, and on the supporting frame 21 of the body are wear straps 28. When the seat is turned with its upholstered side upward, the wear plates 27 rest upon the wear strips 28, and said seat may be slid rearward easily by the manipulation of the lever without marring the finish on the under side of the seat.

The bottom portion of the seat, at the rear, as viewed in full lines in Fig. 2, projects so as to form a ledge 29 adapted to rest in a corresponding rabbeted ledge 30 on the body deck immediately rearward of the seat 3 so as to form a flush joint when the seat is turned in position to serve as a cover or hatch. On the opposite edge of the seat is a rabbet 31 adapted to receive the ledge 13$^b$ on the back when it is turned into position to form a cover and thus the entire top of the compartment 2 is covered in or decked over and protected from the weather, whereby luggage may be stored within this compartment when desired and be protected from dust and rain.

Assuming the compartment to be closed, the body may be converted into the two seated type by seizing the handle 15$^a$ on the back 13 and turning the back into the erect position indicated by full lines in Fig. 2. The door 4 having been opened, the seat 14 may be turned over by passing the hand under it near the forward edge (as viewed shown in its closed position), the seat turning around the lateral studs 20 of the V-shaped brackets 19 and coming to rest upon the forward ends of the wear straps 28. The compartment may then be entered by the door 4, the handle lever 26 seized and lifted, sliding the seat 14 back to its normal position adapted for passengers; or a person in the front seat 3 may reach his arm over the back of the seat 3 and manipulate the lever in the same manner.

In converting the body from the open two seated type into the one seated type with covered compartment, the lever 26 will be depressed and the seat slid forward until the studs 20 on the V-shaped brackets 19 rest in the forward depressed seats 16 of the slot 12. The seat 14 may then be turned over into the position shown in dotted lines in Fig. 2. After that the back 13 may be turned about the pivot stud 16 thus completely closing the compartment.

Having described my invention, what I claim and desire to secure by Letters Patent is:

1. The combination of a vehicle body having a compartment, a seat and a back therein of size and form adapted to jointly form a closure for said compartment, a bar secured at each side of the compartment, means for pivoting the back to the rear end of said bar whereby the back may turn about said pivot from the erect position to serve as a back to the horizontal position to serve as a cover, brackets on the seat having pivot studs, slide bearings for said pivot studs so disposed on said bars that when the pivot studs are at the front end of said slide bearings the seat may be turned over to function as a cover and when said pivots are at the rear end of said slide bearings the seat may assume its normal position to receive passengers.

2. In a convertible vehicle body having a compartment and seat support, a slide bearing at each side of the compartment arranged at a level intermediate said seat support and the upper edges of said sides, a seat having brackets provided with studs adapted to be guided in said slide bearings and to be pivoted therein, said studs being disposed in a plane above the normal seating surface of the seat, the disposition of the parts being such that when the pivot studs are at the front ends of the slide bearings the seat may be turned into position to serve as a cover for the compartment and when at the rear ends of said slide bearings the seat may be sustained thereby in normal seating position and rest upon the seat support in the compartment.

3. In a vehicle, a body having a compartment, slide bearings at each side of the compartment, a seat having brackets provided with studs pivoted and movable in said slide bearings, a support at the under portion of the compartment, wear straps on said support, wear plates on the seat adapted to rest upon the wear straps, the disposition of the parts being such that when the studs are at the forward ends of the slide bearings the seat may serve as a cover for the compartment and when at the rear ends may be supported thereby in position to receive a passenger in conjunction with the support at the bottom of the compartment.

4. In a convertible vehicle body having a compartment and seat support, a bar secured at each side of the compartment, each bar having a slot at its forward end and an opening extending from the slot to the exterior of the bar, a depressed pivot bearing at each end of the slot, a passenger seat having brackets provided with studs adapted to enter said openings and move in said slots, the relative position of the seat, brackets and bearings being such that when the studs are seated in the forward pivot seats of the slots the seat may cover the compartment and when in the rear pivot seats of the slots may be turned into position to receive passengers.

5. In a convertible vehicle body having a compartment and a seat support, a slide bearing at each side of the compartment, a seat having a bracket at each end provided with studs adapted to engage said slide bearings and to rotate and slide therein, a rocking bar having a lever at each end engaging said studs, and means whereby said bar may be rocked to slide the studs in said bearings and move the seat.

6. In a convertible vehicle body having a compartment with a door at one side, a slotted plate at each side of said compartment, a seat having brackets provided with lateral studs adapted to engage in said slotted plates, a rocking bar having an arm projected from each end and engaging said studs, and a lever secured to said bar at the end opposite said door whereby said brackets and studs may be moved along the slots of said plate, the disposition of parts being such that when the studs are at the forward ends of the slots the seat may be turned into position to serve as a cover for the compartment and when at the rearward end may be turned into position to serve as a seat for passengers.

In testimony whereof I affix my signature.

COON A. DEAS.